Aug. 15, 1939.　　H. F. PARKER　　2,169,451
FLUID MOTOR
Filed Dec. 3, 1936　　5 Sheets-Sheet 1

INVENTOR.
Humphrey F. Parker.
BY
Harness, Dickey, Pierce & Hann.
ATTORNEYS.

Aug. 15, 1939.         H. F. PARKER         2,169,451
                        FLUID MOTOR
              Filed Dec. 3, 1936         5 Sheets-Sheet 4

Fig.21.
Running Position.

Fig.22.
Parked Position.

INVENTOR.
Humphrey F. Parker.
BY
Harness, Dickey, Pierce & Hann.
ATTORNEYS.

Aug. 15, 1939.    H. F. PARKER    2,169,451
FLUID MOTOR
Filed Dec. 3, 1936    5 Sheets-Sheet 5

INVENTOR.
Humphrey F. Parker.
BY
Harness, Dickey, Pierce & Hann
ATTORNEYS.

Patented Aug. 15, 1939

2,169,451

UNITED STATES PATENT OFFICE 2,169,451

FLUID MOTOR

Humphrey F. Parker, Detroit, Mich.

Application December 3, 1936, Serial No. 114,010

23 Claims. (Cl. 121—142)

The present invention relates to fluid pressure operated motor mechanisms, and in partiuular provides improved fluid pressure operated motor mechanisms characterized in that the motor may automatically be brought to rest in a selected position of the movement thereof.

The co-pending application of the present applicant Serial No. 106,134, filed October 17, 1936, discloses fluid pressure operated motor mechanisms of the general type to which the motor mechanisms of the present invention relate. In the co-pending structures, the fluid pressure motor comprises generally an oscillatable vane or a reciprocable piston, movable between predetermined limits by the alternate application of fluid pressure to the opposite sides of the vane or piston. The alternate application of fluid pressure is controlled by a reversing valve adapted to be moved to one limit position by the application of fluid pressure thereto, and adapted to be moved to the other position by a compression spring, upon the exhaustion of the just mentioned fluid pressure. In order to bring the vane or piston to rest in a predetermined position in its stroke, preferably of one of the limit positions, "parking" means are provided which respond to the position of the vane or piston. The "parking" means are illustrated in the co-pending application as taking the form of a valve disposed to prevent completion of a fluid supply circuit to the reversing valve, so that, upon reaching one of the limit positions, the valve fails to reverse, and the vane or piston consequently remains at rest in the limit position. The co-pending construction also embodies alternative arrangements by which the vane or piston may be caused to assume a parking position beyond the normal limit of its travel, as well as means incorporated in the "parking" valve for controlling the motor speed.

In accordance with the present invention, it is preferred to effect the parking of the vane or piston by cutting off the supply of fluid pressure thereto, the cut-off mechanism being so arranged that it is rendered effective only when a limit position of the vane or piston is reached, or alternately, when the vane or piston has been permitted to move to a position slightly beyond its normal limit of travel. In the preferred construction, the cut-off mechanism takes the form of a supplemental valve of the fluid pressure actuated type, suitably positioned within the motor and arranged to control the fluid pressure supply circuit leading to the piston or vane chamber. The control valve is arranged for selective control by a "parking" or stop valve and also by the position of the vane or piston.

With the just stated as well as other improvements in view, objects of the present invention are to provide a fluid pressure operated motor mechanism, embodying a movable vane or piston, and embodying improved means for cutting off the supply of pressure to said vane or piston when in a selected position; to provide such a construction in which the stopping of the motor may be caused to occur either at a normal limit position of the vane or piston or at a position thereof beyond a normal limit; to provide such a motor construction which may embody speed regulating mechanism for controlling the normal operation of the motor; to provide such a system in which the cut-off mechanism embodies a supplemental valve of the fluid pressure operated type, arranged to control the supply of fluid pressure to the vane or piston chamber; to provide such a system in which the movements of the supplemental or cut-off valve are jointly controlled by a selectively operable parking device and by the position of the motor vane or piston, so that the parking device may be operated at any time independently of the position or direction of travel of the vane or piston; and to provide such a mechanism embodying main fluid passages adapted to control the normal operation of the vane or piston and of the various valves, and also embodying secondary passages for preventing faulty operation thereof.

Further objects of the present invention are to provide a fluid pressure operated motor mechanism embodying characteristics of the above generally stated character, which may be readily and economically manufactured, assembled and installed and which is positive and reliable in operation.

With the above, as well as other and more detailed objects which appear in the following description and in the appended claims, preferred but illustrative embodiments of the present invention are shown in the accompanying drawings, throughout which corresponding reference characters are used to designate corresponding parts and in which:

Fig. 27 is a view in horizontal section taken along the line 27—27 of Fig. 25;

Referring first to the embodiment shown in Figs. 1 through 10, the motor designated as a whole as 50, comprises two castings 52 and 54, suitably secured, as by the studs 56, in back to back relation. The two castings 52 and 54 together define a piston chamber 58 of generally semi-circular shape, within which a vane 60, secured to a shaft 62, is reciprocable under the influence of fluid pressures alternately applied to the opposite faces thereof in the manner hereinafter described. The right-hand end 64 of shaft 62, as viewed in Fig. 5, projects outwardly of the casting 54, and may be suitably connected to the mechanism to be actuated by the oscillation of the vane 60. A representative application of the present invention is in connection with the operation of vehicle windshield wipers, and in such applications the motor may either be mounted adjacent the windshield or remotely therefrom, as in the engine compartment. Where oil is used as the motive fluid, the engine compartment mounting is preferred, and the transmission between the motor and the wiper or wipers may take the form disclosed in the co-pending application of the present applicant, Serial No. 102,098, filed September 23, 1936. In the co-pending construction, the projecting end 64 of the shaft 62 of Fig. 5 of the present application is provided with a pinion in continuously meshing relation to a pair of oppositely disposed racks which are connected by flexible cables or Bowden wires to the wiper or wipers. The oscillation of the shaft effects corresponding oscillatory movements of the racks which are transmitted to the wipers themselves as oscillatory movements. As shown, the casting 54 is provided with portions 66 which defines a recess within which the just mentioned racks may move. It will be appreciated, however, that the motor may be associated with transmission systems other than the just mentioned transmission system, and may be used in many applications other than the windshield wiper systems.

Figure 1:
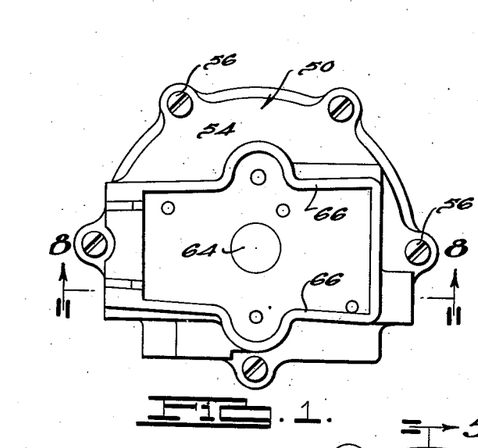
Figure 1 is a view in rear elevation of a motor of the vane type embodying the invention.
Figure 2:
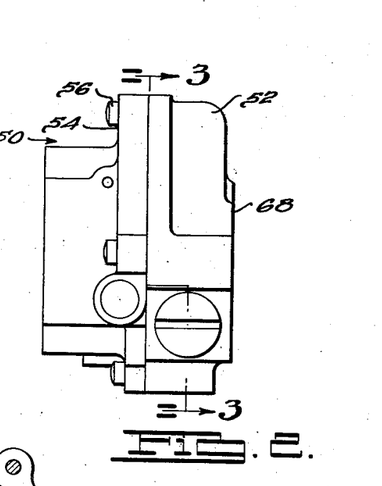
Fig. 2 is a view in end elevation of the motor shown in Fig. 1.

The right-hand side of the casting 52, as viewed in Fig. 2, is preferably machined to provide a face 68, through which the motor 50 may be secured to suitable supporting structure. In instances where the improved motor of the present invention is used in connection with the operation of the windshield wiper of a vehicle and oil is used as the motive fluid, the motor may be mounted adjacent the vehicle engine, and the face 68 positioned in engaging relation to a pad 69 provided on the block of the engine, which mounting simplifies the problem of delivering oil from the oil pressure system of the motor and returning the oil from the motor to the crank case.

In the illustrated embodiment of the invention, the valve mechanisms for automatically controlling the starting, stopping and reversing of the vane 62, comprise a piston type fluid pressure actuated reversing valve 70, which controls the application of fluid pressure to the opposite faces of vane 60; a cut-off valve 72 of the fluid pressure actuated type which as hereinafter described, may be automatically controlled to shut off the supply of fluid pressure to the motor 50; and a manual or parking valve 74.

The reversing valve 70 is slidable in a suitable passage provided therefor in the casting 52, the otherwise open end of which is closed by a suitable removable plug 76. The valve passage space 78 between the plug 76 and the end of valve 70 forms what is hereinafter referred to as a valve actuating chamber, to which the oil or other motive fluid is selectively introduced and exhausted as hereinafter described. As will be appreciated, introduction of fluid pressure into the chamber 78 forces valve 70 to the left as viewed in Fig. 3 against the force of a compression spring 80 which is received within a tubular bore provided therefor in the valve body and one end of which bears directly against the left-hand end of the valve passage. Exhaustion of the fluid from the chamber 78 permits the spring 80 to force valve 70 to the illustrated or extreme right-hand position in which the stop 82 provided on the end of the valve body abuts the plug 76. The valve 70 is provided with two annular recessed portions 84 and 86, separated by a land 88 of larger radius, which two recessed portions alternately connect opposite sides of the vane to the source of fluid pressure and to exhaust, as hereinafter described.

Figures 6, 7, 8:
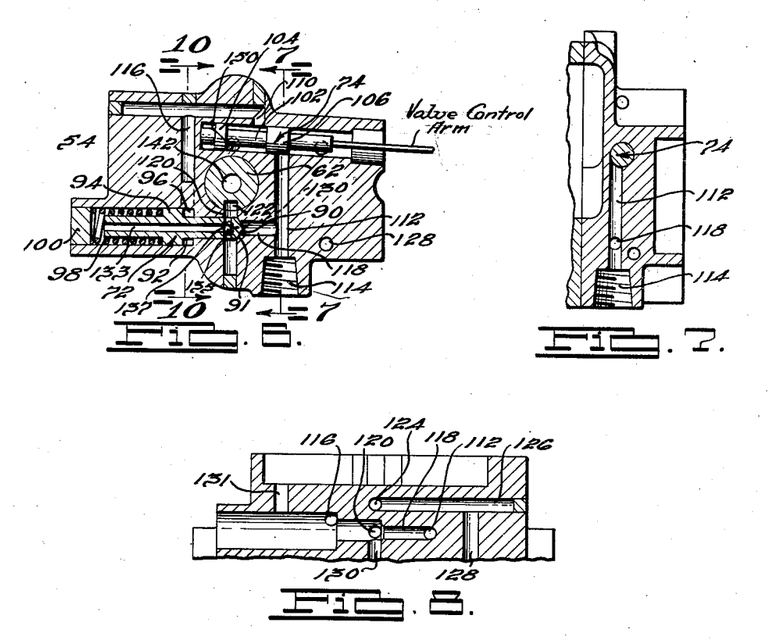
Fig. 6 is a view in vertical section, taken along the line 6—6 of Fig. 5.
Fig. 7 is a fragmentary view in vertical section, taken along the line 7—7 of Fig. 6.
Fig. 8 is a view in horizontal section, taken along the line 8—8 of Fig. 1.
Figure 9:
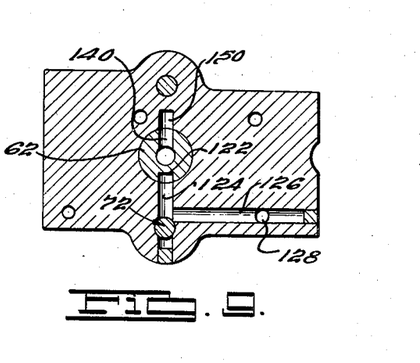
Fig. 9 is a view in vertical section, taken along the line 9—9 of Fig. 5.
Figure 10:
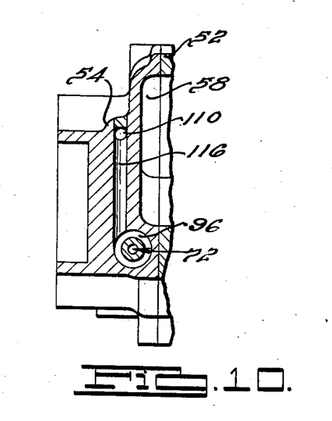
Fig. 10 is a fragmentary view in vertical section, taken along the line 10—10 of Fig. 6.

The cut-off valve 72, most clearly shown in Fig. 6, is received in a suitable passage provided therefor in the casting 54, and comprises a needle valve portion 90 which seats against a seat 91 formed in one of the fluid passages, and, as hereinafter described, is disposed to directly control the admission of fluid pressure to the reversing valve 70 and consequently to the vane chamber. Valve 72 is provided with a reduced portion 92, which, with an adjacent enlarged portion 94, forms a supplemental valve actuating chamber 96 into which fluid pressure may be introduced to move valve 72 to the left, to the open position thereof, permitting the motor to start and operate. As hereinafter described, the fluid pressure may also be selectively exhausted from the chamber 96, thereby rendering a compression spring 98, which surrounds the body of valve 72, to force valve 72 to the illustrated closed position, the spring 98 is seated between the enlarged portion 94 and a plug 100 which closes the otherwise open end of the passage provided for in valve 72.

The manual valve 74, most clearly shown in Fig. 6, is illustrated as also being of the piston type, provided with a recessed portion 102, separated by two enlarged portions 104 and 106. Valve 74 is freely manually slidable in a passage provided therefor in the casting 54, and is illustrated in Fig. 6 in the stop position thereof. In this position the portion 106 closes off the fluid pressure supply circuit to the cut-off valve actuating chamber 96, and prepares an exhaust circuit for the chamber 96, as described in detail hereinafter. The actuating means for valve 74 is not illustrated but, as will be appreciated, may take any convenient form such as a flexible cable or wire, the connector for the casing of which may be suitably secured to the casting 54.

The remaining mechanical details of the motor, including the various supply and exhaust passages involved in the fluid circuits associated with the various valves and with the vane chamber, may be best understood in connection with a description of operation of the motor as a whole. Throughout the following description, only the active fluid passages are referred to and given the reference characters. Any fluid passages shown in the drawings and not given reference characters are dead-end passages, closed by removable plugs, and formed as an incident to the formation of the active passages, as will be understood.

The parts are shown in the stopped position, that is manual valve 74 occupies its left-hand limit position in which it prepares a fluid exhaust circuit for the chamber 96 associated with the cut-off valve 72; valve 72 is in its shut off position in which the supply of fluid to the vane chamber 58 is interrupted; vane 60 is in its right-hand limit of travel, in a parked position; and reversing valve 70 is in its right-hand position.

To place the motor 50 in operation, the manual valve 74 may be moved to the right (Fig. 6) so that the recess 102 thereof registers with both of the passages 110 and 112, thus completing a fluid pressure supply circuit for the valve chamber 96. This fluid pressure supply circuit extends from the inlet 114 (which may be connected to a source of fluid pressure, such as the pressure lubrication system of a vehicle, in any suitable way), through the passage 112, around the recess 102, and through the passages 110 and 116 into the chamber 96. Completion of this circuit results in the building up of a pressure within the chamber 96, forcing cut-off valve 72 to the left as viewed in Fig. 6 against the force of the compression spring 98.

The movement to the left of valve 72 moves the needle valve portion 90 thereof out of seating relation to the seat 91, thereby completing a fluid supply circuit to the reversing valve actuating chamber 78 and also completing a fluid pressure supply circuit leading through the valve 70 into the portion of chamber 58 at the left-hand side of vane 60.

The fluid pressure supply circuit for the valve actuating chamber 78 extends from the inlet 114 through the passage 112, connecting passage 118, vertical connecting passage 120 to a recess 122 formed in the motor shaft 62. This recess is arranged to register with the vertical passage 120 only when the vane 60 is in its illustrated right-hand limit position, for a reason which will presently appear. From the recess 122, the fluid circuit extends through a vertical passage 124, which registers with the recess when the vane is in the right-hand limit position, and then through passages 126 and 128 into the valve chamber 78. The just traced fluid circuit is one that is completed at each arrival of the vane 60 at its right-hand limit position. As described hereinafter, however, each stopping operation cuts off the supply of fluid to valve chamber 78, which cut-off usually occurs before a substantial pressure is built up within chamber 78. With motor 50 at rest, accordingly, valve 70 normally may be expected to occupy its righthand position, but completion of the above circuit which occurs immediately after moving cut-off valve 74 to the running position, causes valve 70 to move to its left-hand limit position, against the force of the compression spring 80. Thus, in the starting operation it is immaterial whether valve 70 initially occupies its right-hand limit position or an intermediate position, since the starting operation immediately forces the valve to its left-hand position.

With valve 70 in the left-hand position, a fluid pressure supply circuit is completed for the portion of chamber 58 to the right of the vane 60 and a fluid exhaust circuit is completed for the portion of chamber 58 to the left of the vane 60. The fluid pressure supply circuit extends from the inlet 114, through the passages 112 and 118, around the valve seat 91, and thence through a lateral main supply passage 130 to valve 70. From passage 130, the circuit extends around the recess 84 of valve 70 and through passage 132 into the chamber 58. The fluid exhaust circuit extends from the portion of chamber 58 to the left of vane 60 through the passage 134, around the recess 86 of valve 70 and thence through an exhaust port 136 into the sump. As previously stated, where the motor 50 is secured to the block 69 of a vehicle engine, the exhaust passage 136 may be directed through the wall of the block into the vehicle engine crank case.

Figure 3:
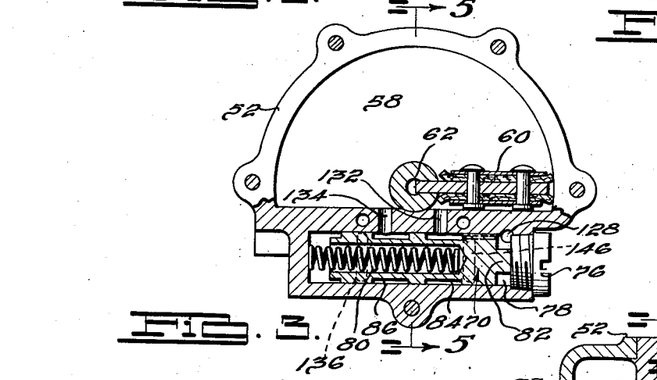
Fig. 3 is a view in vertical section taken along the line 3—3 of Fig. 2.
Figure 4:
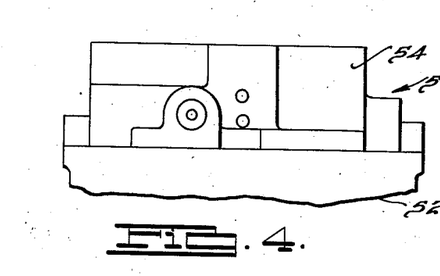
Fig. 4 is a fragmentary view of the underside of the motor of Figs. 1 and 2.
Figure 5:
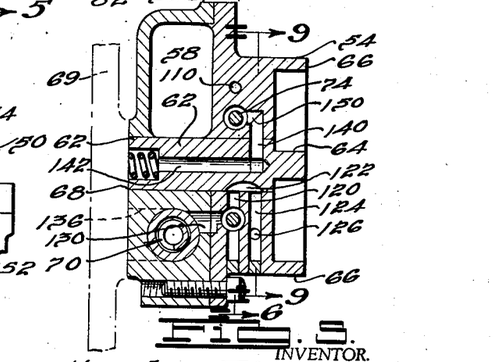
Fig. 5 is a view in vertical section, taken along the line 5—5 of Fig. 3.

During completion of the just traced two circuits, accordingly, vane 60 is acted upon by a differential pressure which causes it to move in a counter-clockwise direction, as viewed in Fig. 3. The initial movement of vane 60 away from the position illustrated in Fig. 3 moves the shaft recess 122 out of registry with the passages 120 and 124, interrupting the previously traced fluid pressure supply circuit for the valve actuating chamber 78. This action is without effect, however, except to trap the previously delivered fluid within the chamber, which trapped fluid retains valve 70 in its illustrated right-hand limit position.

As vane 60 approaches its left-hand limit of travel, a radial passage 140 formed in shaft 62, is brought into registry with the previously described passage 124, thereby completing an exhaust circuit for the valve chamber 78. This exhaust circuit extends from chamber 78 through the passages 128, 126 and 124 into the radial shaft passage 140. The radial shaft passage 140 communicates with an axial passage 142 which leads directly to the sump, and through which the fluid previously trapped within the chamber 78 may freely flow. Accordingly, upon completion of the above traced circuit, the spring 80 associated with valve 70 is rendered effective to force valve 70 to its illustrated right-hand limit position in which the stop 82 formed therein engages the plug 76.

The movement of valve 70 to its right-hand limit position interrupts the previously traced fluid pressure and exhaust circuits for the chamber 58, and re-completes opposite circuits, through which fluid pressure is supplied to the left-hand face of vane 60, and fluid is exhausted from the right-hand face thereof. The fluid pressure supply circuit for the left-hand face of vane 60 extends as previously stated to the main supply passage 130. From this point the circuit extends around the valve recess 86 and through the passage 134 into the chamber 58. The exhaust circuit on the other hand extends through the passage 132, around the valve recess 84, and thence to the sump through a passage 146 which corresponds in all respects to the previously described exhaust passage 136. During completion of the just traced fluid circuits, accordingly, vane 60 is caused to move in a clockwise direction as viewed in Fig. 3.

The initial movement of vane 60 away from its left-hand limit of travel, interrupts the previously traced exhaust circuit for the valve actuating chamber 78. This action is without effect, however, as chamber 78 is now empty, and valve 70 is retained in its right-hand position by the spring 80. As vane 60 approaches its right-hand limit of travel, the previously traced fluid pressure supply circuit for valve actuating chamber 78 is re-completed, by the movement of the shaft recess 122 into registry with the passages 120 and 124. Re-completion of this circuit supplies a fluid pressure to chamber 78, and valve 70 is, accordingly, forced to its left-hand position against the force of the compression spring 80. This movement of valve 70 re-completes the original fluid supply and exhaust circuits for the vane chamber 58, causing vane 60 to stop, and re-start in the counter-clockwise direction.

As long, accordingly, as parking valve 74 and cut-off valve 72 occupy the running positions, vane 60 continuously reciprocates between the right-hand and left-hand limit positions thereof, each arrival at the right-hand limit position resulting in completing a fluid pressure circuit for the valve chamber 78 and causing valve 70 to move to its left-hand limit position. Similarly, each arrival of vane 60 at its left-hand limit position completes an exhaust circuit for the valve chamber 78, permitting valve 70 to be moved to the right under the influence of the spring 80.

Assuming that it is desired to bring the motor 50 to rest, the manual valve 74 may be moved to the left as shown in Fig. 6, to a position in which the recess 102 thereof is out of registry with the supply passage 112, but is in registry with the passage 110 and the exhaust passage 150. With this positioning of the valve 74, in which the land 106 closes off the passage 112, the previously traced supply circuit for the cut-off valve chamber 96 is interrupted and an exhaust circuit therefor is prepared. The exhaust circuit, however, is not completed until the arrival of vane 60 at its right-hand limit of travel, so that the fluid previously supplied to the chamber 96 remains trapped therein, and valve 72, accordingly, remains in the open position.

As vane 60 approaches its right-hand limit of travel, the previously traced supply circuit for the reversing valve chamber 78 is momentarily completed through the shaft recess 122. In addition, the arrival of vane 60 at its right-hand limit of travel, moves the previously described radial shaft passage 140 into registry with the previously mentioned exhaust passage 150, which is now in communication with the passages 110 and 116 through the recessed portion 102 of the manual valve 74. A fluid exhaust circuit is thereby completed for the chamber 96 which extends therefrom through the passages 116 and 118, around the recessed portion 102 of valve 74 and thence through the passage 150, radial shaft passage 140, and axial shaft passage 142 into the sump. Completion of this circuit permits the spring 98 associated with the cut-off valve 72 to force the needle portion 90 thereof into seating relation to the seat 91, thereby closing off the passage 118, through which passage the reversing valve 70, as well as the actuating chamber 78 thereof, are supplied. Interruption of the supply of fluid to the main reversing supply passage 130 causes the motor to remain at rest in the right-hand limit position and the interruption of the supply of fluid pressure to the valve actuating chamber 78 interrupts the building up of pressure within this chamber. The cut-off valve 72 may readily be arranged so that its complete movement to the shut off position occurs prior to any substantial movement of valve 70 to the left. When so arranged, the motor is brought to rest with the valve 70 in its right-hand position. With this positioning, the fluid introduced into chamber 58 on the left-hand side of vane 60 during the final stroke thereof remains trapped within the chamber while the motor is in the stopped position, and, therefore, remains effective to positively retain the vane in the left-hand position and correspondingly retain any wiper elements connected to the motor in the limit positions.

Alternatively, the motor may be so arranged that the reversing valve 70 is permitted to complete its movement to the left before the cut-off valve 72 completes the shut off action. This may be done, as will be appreciated, by properly proportioning the passages leading into the chambers 78 and 96. In this event, at the time the motor is brought to rest, reversing valve 70 may be expected to occupy a left hand limit position in readiness to cause counter-clockwise direction of travel, the left-hand side of vane 60 being connected to exhaust, and the right-hand side of the vane being connected to the vane supply inlet 130. This relation of parts, except for the structural feature mentioned below, provides a positive fluid lock for the vane 60 which retains it in the parked position, since any movement of the vane 60 away from the parked position creates a substantial vacuum on the right-hand side of the vane 60. This fluid lock is desirable in instances where it is desired to positively retain the motor shaft in the parked position.

Alternatively, and in accordance with the illustrated form of the invention, means may be provided to release this fluid lock and permit the motor shaft to be relatively freely moved away from the parked position by the application thereto of an external force, such as the load connected to the shaft.

Referring further to Figs. 6 and 8, the cut-off valve 72 is provided with an axially extending passage 133, which communicates with a pair of relatively perpendicular radial passages 135 and 137 formed near the needle valve portion thereof. In addition, the left-hand end of valve 72 as viewed in Figs. 6 and 8 is provided with a breather and drain passage 131 which may extend directly to atmosphere or exhaust. As long as the cut-off valve 72 occupies the running position, both of the radial passages 135 and 137 are blocked off rendering the axial passage 133 ineffective. In this instance the passage 131 serves merely to drain from the left-hand end of valve 72 any fluid which may leak around the valve body.

Movement of the cut-off valve 72 to the stopped position shown in Fig. 6, however, brings one or the other of the radial passages 135 and 137 into registry with the main supply passage 130 leading to the reversing valve 70.

Under these conditions, both sides of motor vane 60 are connected to exhaust, one side thereof being connected to exhaust through the normal exhaust circuit, and the other side being connected to exhaust through the supply passage 130, radial passage 135 or 137, axial passage 133 and drain or breather passage 131. Both sides of the vane being connected to exhaust it will be appreciated that vane 60 and shaft 62 may, accordingly, be relatively freely oscillated. If the vane 60 and shaft 62 are moved away from the normal stopped position, it is believed to be evident that these members will remain in the position to which they are moved since the supply circuit for the motor is positively interrupted by the cut-off valve 72. To cause the motor to return to the parked position, the manual control valve 74 may momentarily be moved to the running position and then returned to the stopped position, the resulting operating sequence being as previously described.

Figure 11:
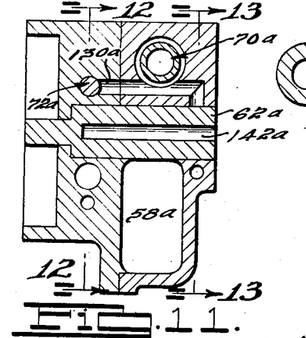
Fig. 11 is a view in vertical transverse section, of a modified construction of the invention, embodying means for selectively controlling the speed of the motor.
Figure 12:
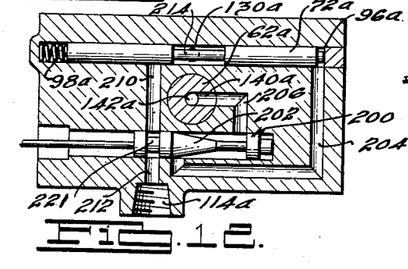
Fig. 12 is a view in vertical section, taken along the line 12—12 of Fig. 11 and showing the cut-off and speed control device in the parking position.
Figure 13:
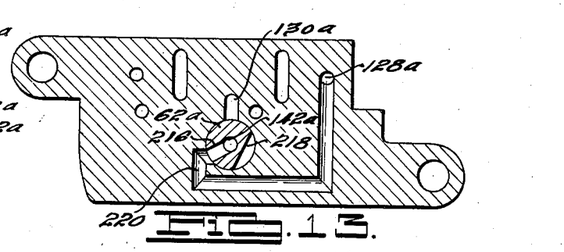
Fig. 13 is a view in vertical section, taken along the line 13—13 of Fig. 11.
Figure 14:
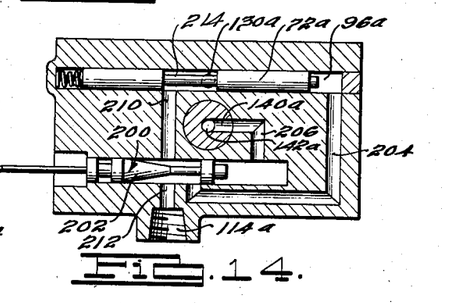
Figs. 14 and 15 are views corresponding to Fig. 12, but showing the combined parking and speed control device in the fast and slow speed position respectively.
Figure 15:
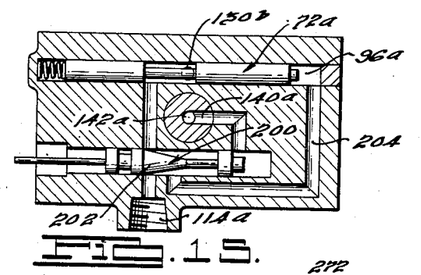

Referring particularly to Figs. 11, 12 and 13, as well as to Figs. 14 and 15, which correspond to Fig. 12 but show different positions of the manual valve, an embodiment of the invention is shown which distinguishes functionally from the previously described embodiment in that the manual parking valve is so constructed as to be effective to control the speed as well as the starting and stopping of the motor. In all other respects except the one just noted, and except as to the respects noted below, the construction and arrangement of the motor of Figs. 11–15 may be as described hereinbefore. Accordingly, in Figs. 11 through 15, only so much of the motor is shown as is necessary to illustrate the differences, and corresponding reference characters with the subscript "a" are used so far as they are applicable.

In the arrangement of Figs. 11 through 15, the previously described parking valve 74 is replaced by a parking valve 200, similar thereto except that the valve 200 is provided with a tapered portion 202, disposed to control the supply of fluid to the reversing valve 70a, and consequently to the vane chamber 58a.

In the parked position of the parking valve 200, and with the motor in a parked position, shown in Fig. 12, the chamber 96a associated with the cut-off valve 72a is connected to exhaust through a circuit corresponding in all respects to the circuit described in connection with the first embodiment. In Fig. 12, this circuit extends from the chamber 96a through a passage 204, into and around the reduced portion of the valve, through passage 206 into a radial passage 140a, and thence through the axial passage 142a to the sump as previously described. During completion of this circuit, accordingly, the spring 98a associated with valve 72a is effective to retain the latter in the right-hand position. In the right-hand limit position, the land 208 of valve 72a closes off the main passage 210 leading from the inlet 114a, which action as will be appreciated from the previous description, retains the motor at rest.

Movement of the manual valve 200 to either the fast speed position shown in Fig. 14 or the slow speed position shown in Fig. 15, interrupts the previously traced exhaust circuit for the valve chamber 96a, and completes a fluid pressure supply circuit therefor which extends from the inlet 114a through the passage 212, around the reduced portion of valve 200 and thence through the passage 204 into the chamber 96a. Completion of this circuit results in the building up of pressure within the chamber 96a, which forces valve 72a to its left-hand limit position, in which the reduced portion 214 thereof is in registry with the passage 210, and also with a main supply passage 130a. Passage 130a may correspond to the passage 130 described with reference to Figs. 1 through 10, and may lead directly to the reversing valve (not shown).

In the instance being described, the passage 130a also leads to the shaft 62a at a point axially spaced from the previously mentioned radial shaft passage 140a. The shaft 62a is provided, in axial registry with the continuation of the passage 130a, with a radial passage 216 and a transverse recess 218. The radial passage communicates directly with the previously mentioned axial shaft passage 142a, leading to the sump, and the transverse shaft recess is adapted to form a connection between passage 130a and a passage 220, which leads directly to a passage 128a. Passage 128a corresponds to the passage 128 of Fig. 3 and opens into the reversing valve actuating chamber.

With this arrangement, when the vane (not shown) reaches one limit of travel as described with reference to Fig. 3, the shaft recess 218 connects passages 130a and 220 together, thereby completing a fluid pressure supply circuit for the reversing valve actuating chamber which extends from the inlet 114a through the passages 212 and 210, around the reduced portion 214 of the supplemental valve 72a, passage 130a, recess 218 and passages 220 and 128a into the valve chamber. Similarly, when the vane reaches its other limit of travel as described with reference to Fig. 3, a fluid exhaust circuit is provided for the valve actuating chamber 78 which extends from the chamber through the passages 128a, passage 220 and thence through the radial and axial shaft passages 216 and 142a to the sump. In the instance now being described, accordingly, the shaft passages for completing fluid supply and exhaust circuits to the reversing valve chamber are entirely separate and distinct from the shaft passage 140a associated with the shut-off valve 72a.

The stopping action of the motor of Figs. 11 through 15 is very similar to the stopping action of the motor of Figs. 1 through 10, and may briefly be described as follows: Movement of the manual valve 200 to the position shown in Fig. 12 interrupts the previously traced fluid pressure supply circuit for the valve actuating chamber 96a, and prepares an exhaust fluid circuit for this chamber through the passage 206. This fluid exhaust circuit is, however, not completed until the radial shaft passage 140a is brought into registry therewith, which occurs only when the motor reaches the predetermined parked position. Pending completion of this fluid exhaust circuit accordingly, cut-off valve 72a remains in the running position, and the only effect upon the motor operation of the movement of the parking valve 200 to the parked position is to prepare the exhaust circuit. In the parked position of the valve 200, an unrestricted flow through the passages 212 and 210 is provided by the annular recessed portion 221 of the valve. Accordingly, although the slow speed position of the valve 200 is passed through in moving the valve 200 to the parking position, the motor is enabled to continue to the parking position at its maximum operating speed. As soon as the motor approaches its selected limit position, the radial shaft passage 140a is moved into registry with the passage 206, thereby completing the previously prepared fluid exhaust circuit for the chamber 96a, and permitting the cut-off valve 72a to be moved to its stopping position by the spring 98a. The movement of the valve 72a to the stopping position brings the motor to rest in the manner described with reference to the motor of Figs. 1 through 10.

In view of the fact that the shaft passage 140a through which the exhaust circuit for the cut-off valve 72a is completed, is entirely independent of the shaft passages 216 and 218 through which the fluid pressure supply and exhaust circuits for the actuating chamber of the reversing valve are completed, it will be appreciated that the motor shaft may be caused to park in either one of its limit positions, depending upon the angular position of the radial shaft passage 140a. That is, if it is desired that the shaft 62a of the motor of Figs. 11 through 15 park in the same position as the shaft 62 of the motor in Figs. 1 through 10, the radial shaft passage 140a may be positioned in the shaft as to register with the passage 206 when such parking position is reached. On the other hand, if it is desired that the shaft 62a park in the opposite position, radial shaft passage 140a may be correspondingly positioned.

If the just mentioned opposite position is selected as the parking position, it will be appreciated that the registry of passage 140a with the passage 206 (to thereby exhaust the chamber 96a) occurs simultaneously with the registry of the radial passage 216 with the passage 220 (to thereby exhaust the reversing valve actuating chamber). In this instance, the stopping of the motor is always accompanied by a movement of the reversing valve to the position of readiness to cause the opposite direction of movement of the motor shaft or vane.

As to the speed control feature of the arrangement of Figs. 11 through 15, it will be noted that in the fast speed position of Fig. 14, the tapered portion 202 of the manual valve 200 is to the left of the passages 212 and 210, permitting a substantially unrestricted flow through these passages. In the slow speed position of the valve shown in Fig. 15, however, the tapered portion 202 is in registry with these passages 210 and 212 and correspondingly restricts the flow therethrough and, therefore, reduces the operating speed of the motor.

Figure 16:
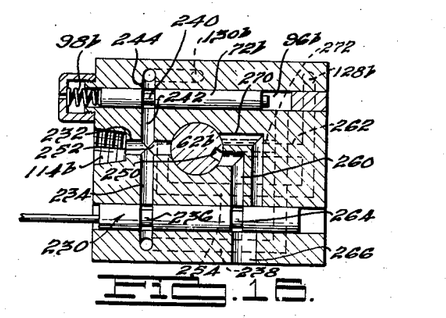
Figs. 16 and 17 are views in vertical section of a further modification of the present invention, in which the motor vane may be automatically parked in a position beyond its normal limit of travel, and showing the parts in the operating and parked positions respectively.
Figure 17:
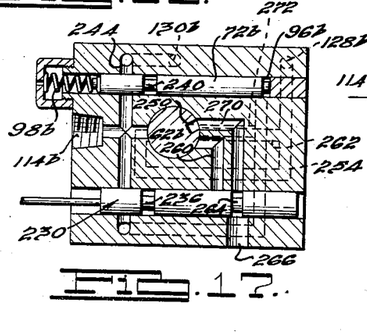
Figure 18:
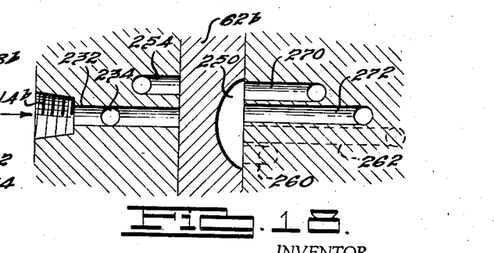
Fig. 18 is a fragmentary schematic view based upon the construction of Figs. 16 and 17.
Figure 19:
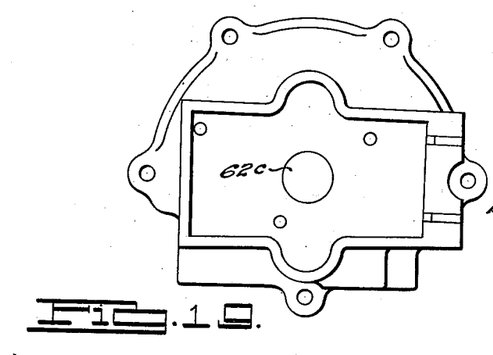
Fig. 19 is a view in rear elevation of a motor embodying a modified construction of supplement cut-off valve.
Figure 20:
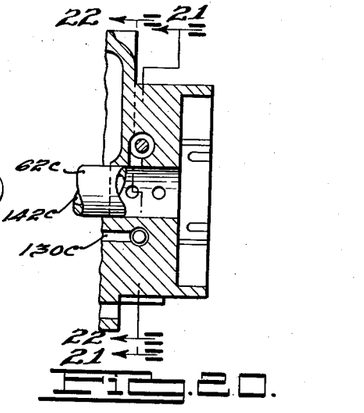
Fig. 20 is a fragmentary view in vertical section of the motor shown in Fig. 19.

The embodiment of Figs. 16, 17 and 18 distinguishes principally from the embodiment of Figs. 1 through 10 in that the parking position of the motor vane is beyond the normal limit of travel thereof. In this arrangement, with the shut off valve in the running position, the motor vane reciprocates between normal limits and, upon movement of the cut-off valve to the stop position, the vane is permitted to travel beyond one of the normal limits, and is there brought to rest.

Except in the respects described below, the construction and arrangement of the motor of Figs. 16, 17 and 18 may be and preferably is as described with reference to Figs. 1 through 10, and so far as applicable, accordingly, corresponding reference characters, with the subscript "b", are used to designate corresponding parts.

The parts are shown in Fig. 16 in the running position of the parking valve 230. In this position of the parts, a fluid pressure supply circuit extends from the inlet 114b through the passages 232 and 234, around the recessed portion 236 of the parking valve and thence through passage 238 into the valve actuating chamber 96b. During completion of this circuit, as will be appreciated from the previous description, the cut-off valve 72b is retained in its illustrated left-hand position, against the force of the compression spring 98b.

As long as the valve 72b occupies its left-hand position, the recess 240 thereof is in registry with the passages 242 and 244, which connect the inlet 114b to the main supply passage 130b. As described with reference to Figs. 1 through 10, as long as the passage 130b is supplied with fluid under pressure, the motor is caused to operate and to oscillate the shaft 62b in one direction or the other, depending upon the position of the reversing valve. As in the previous embodiment, the reversing valve (not shown) is actuated to one limit position by fluid pressure, and is actuated to the other position by spring pressure. In the present instance, each arrival of the motor shaft 62b at its limit position in the clockwise direction of travel moves an axially extending peripheral recess 250 into registry with the two supply passages 252 and 254. This action completes a fluid pressure supply circuit leading directly to the valve actuating chamber (not shown) which circuit extends from the inlet 114b through the passages 232 and 252, shaft recess 250, and passage 254 directly to the passage 128b. Passage 128b may correspond to the previously described passage 128, and may lead directly into the reversing actuating chamber. Each arrival of the motor shaft 62b at its clockwise limit position, accordingly, completes the fluid pressure supply circuit for the reversing valve, causing it to move to the opposite limit position and reverse the direction of the movement of the motor.

On the other hand, each arrival of the motor shaft 62b at the right-hand limit of travel, moving in the counter-clockwise direction, brings the previously mentioned shaft recess 250 into registry with two passages 260 and 262. With the cut-off valve 230 in the running position, this action completes the fluid exhaust circuit for the reversing valve actuating chamber, which fluid exhaust circuit extends from the previously mentioned passage 128b through the passage 262 (which connects into the passage 254), through the shaft recess 250, passage 260, and thence around the recessed portion 264 of the cut-off valve 230 to the sump through the exhaust outlet 266. It is noted, for a reason discussed below, that the two passages 260 and 262 are slightly angularly offset with respect to the rotation of the shaft recess 250, which recess, however, is wide enough to bridge the two passages.

Thus, each arrival of the motor shaft at its normal right-hand limit of travel completes the exhaust fluid circuit for the reversing valve actuating chamber, permitting the valve to be thrown to its other limit position by the spring associated therewith. As long, accordingly, as parking valve 230 occupies the running position shown in Fig. 16, the motor shaft 62b is caused to continuously reciprocate between normal left and right-hand limit positions, in the manner described with reference to Figs. 1 through 10 and Figs. 11 through 15.

Assuming that it is desired to bring the motor to rest, the parking valve 230 may be moved to the position shown in Fig. 17, in which the recess 236 thereof is out of registry with the passages 234 and 238, thus interrupting the previously traced fluid pressure supply circuit for the chamber 96b associated with the cut-off valve 72b. This action also prepares, but does not immediately complete a fluid exhaust circuit for the chamber 96b, since this exhaust circuit is dependent upon the arrival of the motor shaft at a position beyond its normal right-hand limit of travel. The only other immediate effect of the movement of the parking valve to the position shown in Fig. 17, is to prevent completion of the previously described fluid exhaust circuit for the reversing valve through the passage 260 and 266. This is because the movement of the parking valve to the position of Fig. 17 moves the recess 264 out of registry with the passage 260, and into registry with passage 270. Accordingly, in the instance stated, the arrival of the shaft 62b at its normal right-hand limit of travel does not result in a reversing movement of the reversing valve and the motor shaft continues in the counter-clockwise direction until it reaches the position corresponding to the parked position of the shaft.

The arrival of shaft 62b at the position corresponding to the parked position of the motor brings the shaft recess 250 to a postion in which it is out of registry with the previously described exhaust passage 260, but in which it registers with the previously mentioned passage 262, and also registers with two additional passages 270 and 272. As appears more clearly in the schematic view, Fig. 18, the two passages 270 and 272 occupy substantially the same rotative position with reference to the rotation of shaft 62b, but are angularly advanced from the position of the passage 262. The degree of angular advance is less than the span of the shaft recess 250. With this relation, accordingly, shaft recess 250 spans the passage 262 and the previously mentioned passage 260 when the motor shaft reaches its normal limit of travel; and interconnects the passage 262 with both of the passages 270 and 272 when the motor reaches its parked position.

The movement of shaft recess 250 into simultaneous registry with the passages 262, 270 and 272 complete a fluid exhaust circuit for the chamber 96b associated with the cut-off valve 72b, and also connects the passage 128b to exhaust. The fluid exhaust circuit for the chamber 96b extends from this chamber through passage 272 which interconnects with the previously mentioned passage 238, through the shaft recess 250 and thence through passage 270, valve recess 264 (which is now in registry therewith) and through the exhaust line 266 to the sump. The fluid exhaust circuit for the line 128b which, as previously described, connects into actuating chamber for the reversing valve, extends from this passage through the passage 262 which interconnects therewith and thence through the shaft recess 250 and passage 270 to the sump as just traced. Completion of these two circuits permits the cut-off valve 72b to move to its right-hand limit position in which it stops the motor by closing off the passage 130b, as previously described; and also permits the reversing valve (not shown) to move to a position in readiness to bring about an opposite direction of movement upon movement of the parking valve 230 to the running position shown in Fig. 16.

As will be appreciated, the motor may be restarted by moving the parking valve 230 to the position in Fig. 16, thereby re-completing the initially traced circuit for the chamber 96b and actuating the cut-off valve 72b to the running position. As just stated, during the course of the stopping operation, the reversing valve (not shown) is moved to a position in readiness to cause clockwise movement of the motor shaft and so, accordingly, the normal leftward movement of the motor shaft is begun immediately upon the movement of the parking valve to running position.

The embodiment of the invention shown in Figs. 19 through 24 distinguishes principally from the modification described with reference to Figs. 1 through 9 in that the supplemental cut-off valve is moved to the stop position by the application thereto of fluid pressure instead of by the application thereto of spring pressure. The movement of the cut-off valve to running position is also effected by fluid pressure, the arrangement being such that a differential pressure is applied in order to effect the closing movement Certain other structural differences are present in the arrangement of Figs. 19 through 24, which are noted below, but except in these respects, the arrangement and operation corresponds to that of the first described embodiment. Accordingly, only so much of the modified motor is shown in the drawings as is necessary to explain the differences, and corresponding reference characters with the subscript "c" are used so far as applicable.

Figure 22:
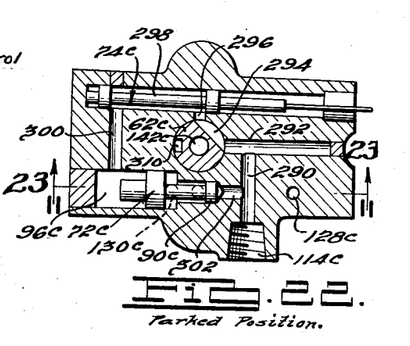
Fig. 22 is a view in vertical section, taken along the line 22—22 of Fig. 20.
Figure 23:
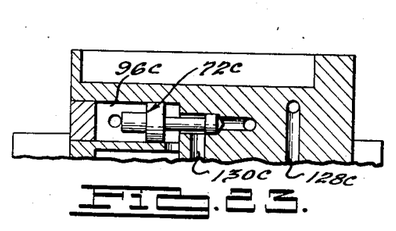
Fig. 23 is a view in horizontal section, taken along the line 23—23 of Fig. 22.
Figure 24:
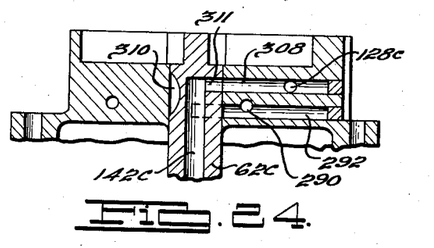
Fig. 24 is a view in horizontal section, taken along the line 24—24 of Fig. 21.
Figure 25:
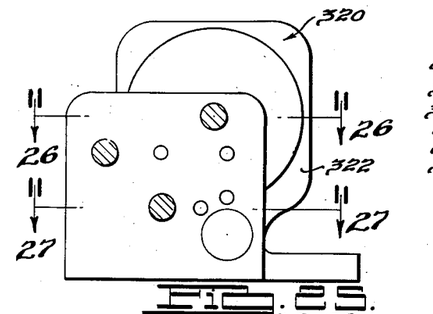
Fig. 25 is a view in end elevation of a piston type motor embodying the invention.

The parts are shown in Fig. 22 in the parked position of the parking valve 74c. In this positioning, a fluid supply circuit is completed for the chamber 96c associated with the cut-off valve 72c, which fluid circuit extends from the inlet 114c, through the passage 290, passage 292, around a transverse slot 294 formed in the shaft 62c, and thence through a passage 296, around the recessed portion 298 of the parking valve, and through passage 300 into the chamber 96c. The shaft recess 294 spans the passages 296 and 292 only when the motor shaft is in the limit position of counter-clockwise travel thereof, or considered with reference to Fig. 3 in the left-hand limit position thereof.

During completion of the just traced fluid circuit, accordingly, the cut-off valve 72c is acted upon by fluid pressure which urges it to its right-hand position, shown in Fig. 22. At the same time, a fluid circuit is complete which tends to move the valve to its lefthand limit position, which fluid circuit extends from the inlet 114c through the passage 299 and connecting passage 302 to the end of the needle valve portion 90c of the valve. The piston area acted upon by the fluid within the chamber 96c, however, materially exceeds the area of the needle valve portion 90c, so that the rightward pressure predominates, and retains the valve 72c in the closed position. In the closed position, as will be appreciated from previous description, the motor shaft 62c is retained at rest.

Figure 21:
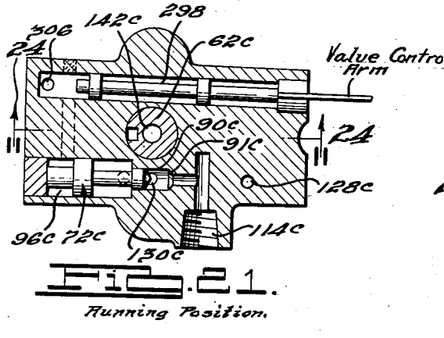
Fig. 21 is a view in vertical section, taken along the line 21—21 of Fig. 20.

In order to place the motor in operation, the parking valve 74c is moved to the right, to the position shown in Fig. 21, in which the recessed portion 298 thereof is no longer effective to interconnect the passages 300 and 296, thus interrupting the just traced fluid pressure supply circuit for the chamber 96b. Movement of the parking valve 74c to the running position also interconnects the passage 300 with a supplemental passage 306 which may extend directly to exhaust, thus providing an exhaust circuit for the chamber 96c. Upon completion of this exhaust circuit, the pressure acting upon the needle valve portion 90c of the valve 72c is rendered effective to force this valve to its left-hand limit position shown in Fig. 21.

The movement of the cut-off valve 72c to the running position connects the previously mentioned main supply passage 130c to the inlet 114c. As described with reference to the embodiment of Figs. 1 through 10, the passage 130c may lead directly to the main reversing valve (not shown), which reversing valve acts to distribute the fluid supplied therethrough to the respectively opposite sides of the motor vane, depending upon the position of the reversing valve.

With the motor shaft 62c in the parked position shown in Fig. 22, the passage 128c, which as previously described, may be connected into the actuating chamber associated with the reversing valve (not shown), is connected to the sump through the axial shaft passage 142c. The circuit extends from the passage 128c, Fig. 24, through passage 308, radial shaft passage 142c to the sump. This circuit as will be appreciated from previous description exhausts the reversing valve actuating chamber, permitting the valve to assume a position in readiness to cause clockwise travel of the motor shaft 62c. Accordingly, upon the completion of the supply circuit for the main supply passage 130c, the motor is immediately caused to start in a clockwise direction from the position shown in Fig. 22.

The initial movement of the motor 62c away from the limit position shown in Fig. 22 moves the transverse shaft passage 294 out of registry with the passages 292 and 296, which action is, however, without effect since the circuit through these passages is already interrupted at the parking valve 74c. The initial movement of the motor shaft 62c away from the limit position shown in Fig. 22 also moves the radial shaft passage 311 out of registry with the passage 308 of Fig. 24, thus interrupting the just traced fluid exhaust circuit for the main reversing valve. This action is without effect, however, as the reversing valve actuating chamber may be considered as empty and the reversing valve is held in its proper position by the actuating spring associated therewith.

As the motor shaft 62c, travelling in the clockwise direction, as viewed in Fig. 22, approaches its clockwise limit position, the peripheral, axially extending, recess 310 provided therein is moved into registry with the passage 308, and also with the passage 292. This action connects passage 128c to the inlet 114c, which as will be appreciated from previous description, supplies fluid to the actuating chamber associated with the reversing valve, causing it to move to its opposite limit position and complete the fluid circuits for the motor vane to cause it to reverse and move in the counter-clockwise direction. The fluid circuit for the passage 128c extends from the inlet 114c through passages 290 and 292, along the shaft recess 310, and thence through passage 308 to the passage 128c.

The initial movement of the motor shaft 62c in the counter-clockwise direction moves the shaft recess 310 out of registry with the passages 292 and 308, thus interrupting the just traced fluid pressure supply circuit for the actuating chamber of the reversing valve. This action is without effect, however, since the interruption of this circuit serves merely to trap the fluid within the chamber, which trapped fluid retains the valve in its proper limit position.

As the motor shaft 62c approaches its limit position travelling in the counter-clockwise direction, the radial shaft passage 311 is again brought into registry with the passage 308, thereby re-completing the previously traced fluid exhaust circuit for the reversing valve chamber which action results in a movement of the reversing valve to a position in which it is effective to cause clockwise travel of the motor shaft. The arrival of the motor shaft 62c at its limit of travel in the counter-clockwise direction also brings the shaft recess 294 into registry with the passages 292 and 296, tending to re-complete the initially traced fluid pressure supply circuit for the control valve 72c. In the operation now being described, however, it is assumed that the parking valve 74c is in the running position of Fig. 21, so that completion of this fluid pressure supply circuit is prevented. Accordingly, as long as the parking valve 74c occupies the running position, the motor shaft 62c is caused to continuously reciprocate between its normal clockwise and counter-clockwise limit positions.

In order to bring the motor to rest, the parking valve 74c is returned to the position shown in Fig. 22 in which the previously traced fluid exhaust circuit for the chamber 96c, through the passage 306, is interrupted, and in which position the fluid pressure supply circuit for this chamber is partially completed. Completion of this fluid pressure supply circuit, however, is dependent upon the arrival of the motor shaft 62c at its limit position in the counter-clockwise direction. Arrival of the motor shaft at this limit position re-completes the circuit for the chamber 96c, causing the cut-off valve 72c to move to its stop position, and in which position it is effective to retain the motor shaft 62c at rest in its left-hand or counter-clockwise limit position. As in the previous instance, also, the arrival of the motor shaft at its counter-clockwise limit position re-completes the fluid exhaust circuit for the reversing valve actuating chamber, permitting this valve to be moved to a position in which it is in readiness to cause clockwise travel of the motor shaft.

The remaining figures of the drawings, Figs. 25 through 33, illustrate an embodiment of the invention in a piston type motor, in accordance with which embodiment, also, the motor may be caused to park in a limit position which is beyond its normal limit of travel.

Referring particularly to Figs. 25 through 33, the motor 320 comprises generally a main casting 322, which is suitably formed to provide a piston chamber 324, the otherwise open end of which chamber is adapted to be closed by a closure plate 326. A conventional piston 328 is slidably received within the chamber 324, and is secured to a piston rod 330, which extends through a suitable bore provided therefor in the casting 322. As will be appreciated the piston rod may be connected to the mechanism to be actuated by the motor in any suitable manner. In applications of the present motor to windshield wiper operating systems, the preferred transmission is as disclosed in the co-pending application of the present applicant, Serial No. 102,098, filed September 23, 1936.

The valve mechanisms associated with the motor, in its illustrated embodiment comprise a reversing valve 332, a cut-off valve 334 and a parking valve 336. The reversing valve 332 is received in a suitable bore provided therefor in the casting 322, and is adapted to be actuated to a position to the left of that shown in Fig. 32 by the introduction of fluid under pressure into chamber 338. Movement of the reversing valve 332 to its illustrated right-hand limit position is effected by exhausting the fluid from the chamber 338, thus rendering a spring 340 effective to move the valve to the right. The spring 340 is received within an axial bore provided therefor in the valve body and an end thereof bears against the casting 332. The cut-off valve 334 is preferably of the type described with reference to the embodiment of Figs. 1 through 15, and is received in a suitable bore provided therefor in the casting 322. Valve 334 is adapted to be actuated to a position to the right of that shown in Fig. 33 by the introduction of fluid pressure into a chamber 342 associated therewith, and is adapted to be moved to the illustrated left-hand position by a spring 344 which is seated between the end of the valve body and a bonnet 346 secured to the casting 322. The parking valve 336 is slidably received in a suitable bore provided therefor in the casting 322, and the end thereof which extends externally of the motor body may be connected in any suitable way to manually or otherwise operated mechanism for moving the valve between its running and parked positions.

The remaining mechanical details of the motor, as well as the description of the various fluid passages formed within the motor body by which the starting, stopping and reversing of the motor is effected may best be understood with reference to a description of the operation of the motor as a whole. Throughout the following description, only the active fluid passages are given reference characters, it being understood that any indicated passages which are not given reference characters are dead-end passages, closed by removable plugs, which are formed as an incident to the manufacture of the active passages.

The parts are shown in the various figures in the parked position of the piston 328, at its left-hand limit of travel, which parked position as previously mentioned is slightly beyond its normal limit of travel. In this position of the parts, the reversing valve 332 occupies its right-hand limit position in which position it is retained by the spring 340 associated therewith, and in which position, as hereinafter described, it is in readiness to effect rightward movement of the piston 328. With the parking valve 336 in the left-hand or parking position shown, and with the piston 328 in its parked position, a fluid exhaust circuit for the chamber 342 associated with the cut-off valve 334 is completed which circuit extends (Figs. 33, 26, 30 and 31) from the chamber 342 through passages 350, 352 and 354, around the recess 356 of the piston rod 330, now in registry therewith, and thence through passages 358 and 360 to the recess 362 associated with the parking valve 336, which is now in registry therewith. From the recess 362, the circuit extends directly to exhaust through the passage 364. During completion of this circuit, accordingly, the cut-off valve 334 is retained in its left-hand illustrated position by the spring 344 associated therewith, in which position of the valve the recess 366 thereof is out of registry with the main supply passage 368. As described hereinafter, the motor piston is retained at rest as long as the passage 368 is closed.

During completion of the above traced fluid circuit for the chamber 342 also, a fluid exhaust circuit is provided for the chamber 338 associated with the main reversing valve 332, which fluid exhaust circuit extends (Figs. 32, 30, 26 and 28) from the chamber 338 through the passages 370 and 372, around the previously mentioned piston rod recess 356, and thence to exhaust through passage 358 as previously described with reference to the circuit for the chamber 342. During completion of the fluid exhaust circuit for the chamber 338, as will be appreciated, the spring 340 associated with the valve 332 is effective to retain the valve in the illustrated right-hand limit position.

In order to place the motor in operation, the parking valve 336 is moved to its right-hand limit position, in which the recess 374 provided therein is in registry with the supply passage 376, and in which the recess 362 is moved out of registry with the previously mentioned passage 358. Movement of the parking valve recess 362 out of registry with the passage 358 interrupts the previously traced fluid exhaust circuit for the reversing valve chamber and for the chamber 342 associated with the cut-off valve 334. Movement of the parking valve recess 374 into registry with the supply passage 376 completes a fluid supply circuit for the chamber 342, which circuit extends (Figs. 29 and 33) from the inlet 378 through passage 380, around the recess 374, and thence through passages 376, 382 and 350 into the chamber 342. Completion of this circuit admits fluid under pressure to the chamber 342, accordingly forcing the valve 334 to its right-hand limit or running position, in which the recess 366 thereof registers with the previously mentioned main supply passage 368 for the motor.

Under these conditions, and with the reversing valve 332 in its illustrated right-hand position, the chamber portion on the left-hand side of piston 328 is connected to the inlet 378, and the chamber portion at the right-hand side of the piston 328 is connected to exhaust. The fluid pressure supply circuit for the chamber portion at the left-hand side of the piston extends (Figs. 29, 27, 32 and 26) from the inlet 378, through passage 384, around the recess 366 and passages 368, 386, and 388 into the chamber within which the reversing valve is positioned. With valve 332 in the right-hand limit position, the recess 390 thereof connects the passage 388 with the passage 392, which, through passage 394, opens directly into the chamber 324 at the left-hand side of the piston 328. With valve 332 in the right-hand position, also, the fluid exhaust circuit for the right-hand side of piston 328 extends from chamber 324 (Fig. 32) through passage 396, around recess 398 of valve 332, and thence through passage 400 directly to exhaust. During completion, as will be appreciated, of the just traced fluid pressure supply and exhaust circuits, piston 328 is acted upon by a pressure differential which causes it to move to the right as viewed in Fig. 26.

The initial movement to the right of piston 328 moves the piston rod recess 356 out of registry with the previously described passage 358, which action is, however, without effect, as the fluid exhaust circuit associated with this passage is already interrupted by the parking valve. As the rightward movement of piston 328 continues, the piston rod recess 356 is moved into registry with the passage 402 which, as hereinafter described, re-completes a fluid exhaust circuit for the chamber 338 associated with the reversing valve 332. This circuit is, however, without effect, since valve 332 is already in its right-hand limit position.

As piston 328 approaches its right-hand limit of travel, the piston rod recess 356 is moved into registry with the two passages 404 and 406, (Fig. 26) which action completes a fluid pressure supply circuit for the chamber 338 associated with the reversing valve 332. This fluid pressure supply circuit extends (Figs. 29, 26 and 32) from the inlet 378, through passage 384, cut-off valve recess 366, passage 368, passage 406, piston rod recess 356, and passage 404 directly into the chamber 338. Completion of this circuit accordingly admits fluid under pressure to the reversing valve actuating chamber, causing the valve to move to its left-hand limit position, in which position the recess 390 connects the passage 392 to exhaust through passage 408, and connects the passage 396 to the supply passage 388. In the just stated left-hand limit position of the valve, also, the passage 392 is closed off from the inlet 388, and the exhaust passage 400 is rendered ineffective. It is believed to be evident that with the reversing valve in the left-hand position as just stated, the fluid pressure supply and exhaust circuits for the piston chamber 324 are the reverse of those previously stated, resulting in movement to the left of the piston 328.

The initial leftward movement of piston 328 moves the piston rod recess 356 out of registry with the passages 404 and 406, interrupting the just traced fluid pressure supply circuit for the chamber 338. This action is without effect upon the position of the valve, however, since the fluid previously introduced into this chamber remains trapped therein, and holds the valve in the left-hand limit position.

As the piston 328 approaches its normal left-hand limit of travel, the piston rod recess 356 is moved into registry with the previously mentioned passage 402 and a cooperating passage 410, which action re-completes the fluid exhaust circuit for the reversing valve 338. This fluid exhaust circuit extends (Figs. 32, 26, 28 and 31) from the chamber 338, passage 370, connecting passage 412, passage 410, recess 356, and thence through passages 402 and 414, around the parking valve recess 362 (now in registry therewith) and passage 416 to exhaust. Upon completion of this circuit, the fluid previously delivered to the chamber 338 is discharged therefrom and the reversing valve 332 caused to resume its illustrated right-hand limit position under the influence of the compression spring 340 associated therewith. The movement of the reversing valve to its right-hand limit position restores the original fluid pressure supply and exhaust circuits for the piston chamber 324, causing the piston to stop and restart in the rightward direction. The reversing action at the right-hand limit of travel is, of course, a duplicate of that previously described.

It will be appreciated, accordingly, that as long as the parking valve 336 occupies the running position in which the recess 362 thereof registers with the passage 416, the piston continuously reciprocates between a left-hand limit position in which the piston rod recess 356 registers with the passages 410 and 402, and a right-hand limit position in which the piston rod recess 356 registers with the passages 404 and 406.

Figure 31:
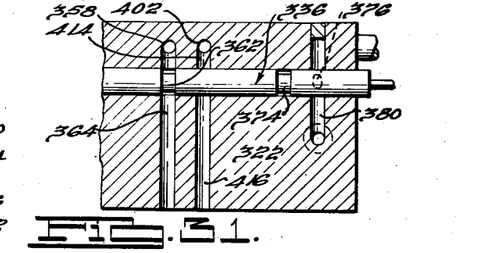
Fig. 31 is a view in vertical section taken along the line 31—31 of Fig. 29.
Figure 32:
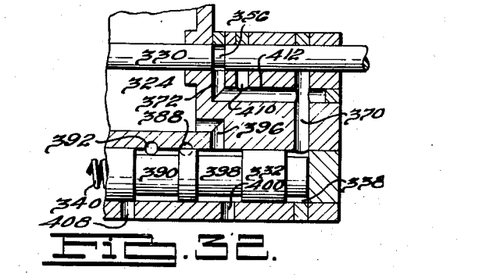
Fig. 32 is a view in vertical section taken along the line 32—32 of Fig. 29; and, Fig. 33 is a view in vertical section taken along the line 33—33 of Fig. 29.
Figure 33:
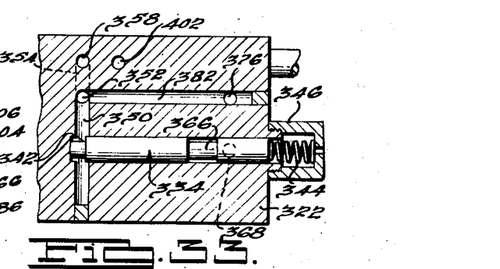

In order to bring the motor to rest at its illustrated left-hand limit position (Fig. 26) the parking valve 336 is moved to the position shown in Fig. 31, in which the recess 362 is out of registry with the passage 416 and is in registry with the passage 358. In this position, also, recess 374 is out of registry with the main supply passage 376.

The movement of the parking valve recess 374 out of registry with the supply passage 376 interrupts the previously traced fluid pressure supply circuit for the chamber 342 associated with the cut-off valve 334. A fluid exhaust circuit for this chamber, however, is not completed until the piston 328 reaches the position shown in Fig. 26 so that the movement of the parking valve to the stopping position has no immediate effect upon the movement of the piston.

If the parking valve 336 is moved to the stopping position during rightward travel of the piston 328 it is believed obvious that a normal reversal at the right-hand limit of travel will occur. If the parking valve 336 is moved to the stopping position during leftward travel of the piston 328, no effect upon movement of the piston results until the piston reaches the position shown in Fig. 26. During such final leftward movement, the piston rod recess 356 is moved into registry with the passage 410, tending to complete the previously traced exhaust circuit for the chamber 338. Completion of this exhaust circuit, however, is prevented since the passage 416 is now closed by the parking valve 336. No reversing movement of the reversing valve 332 occurs at the normal left-hand limit of travel of the piston accordingly, and the piston continues its leftward movement beyond such normal left-hand position.

Figure 26:
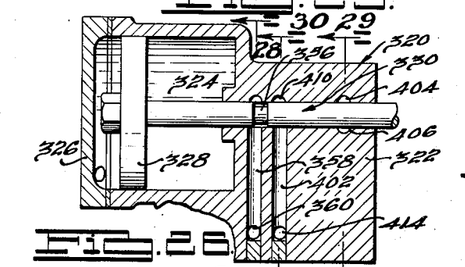
Fig. 26 is a view in horizontal section taken along the line 26—26 of Fig. 25.
Figures 28, 29:
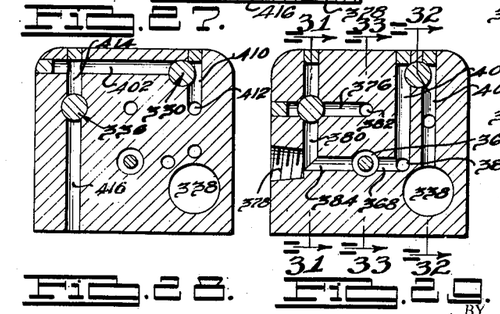
Fig. 28 is a view in vertical section taken along the line 28—28 of Fig. 26.
Fig. 29 is a view in vertical section taken along the line 29—29 of Fig. 26.
Figure 30:
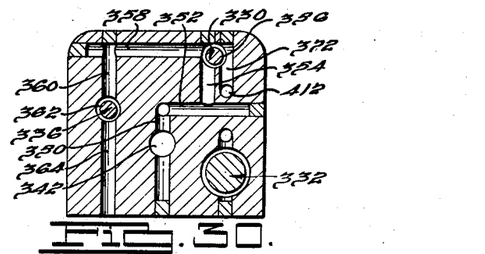
Fig. 30 is a view in vertical section taken along the line 30—30 of Fig. 26.

As the piston approaches the position shown in Fig. 26, the piston rod recess 356 is moved into registry with the previously mentioned passage 358, thereby simultaneously completing a fluid exhaust circuit for the reversing valve chamber 338, and a fluid exhaust circuit for the chamber 342 associated with the cut-off valve 334.

The fluid exhaust circuit for the chamber 342 extends as described at the beginning of the present description of operation. Completion of this circuit permits valve 334 to resume the illustrated position under the influence of the spring 344, in which the main supply passage 368 is closed, causing the piston 328 to remain at rest. The fluid exhaust circuit for the reversing valve chamber 338 extends (Figs. 32, 26, 31 and 30) from the chamber 338, passages 370, 412 and 372, around the piston rod recess 356, and thence through passages 358 and 360 around the parking valve recess 362 and passage 364 to exhaust. Completion of this circuit permits the reversing valve 332 to resume the right-hand limit position shown in Fig. 32, in which position it is in readiness to complete the fluid circuit for the piston chamber to cause rightward movement thereof.

Although specific embodiments of the present invention have been described in detail, it will be appreciated that various modifications in the form, number and arrangement of the parts thereof may be made within the spirit and scope of the present invention.

What I claim is:

1. Fluid pressure operated motor mechanism comprising, in combination, a member movable under the influence of differential pressure; means including a fluid circuit and a reversing valve mechanism for controlling the application of said differential pressure to said member; and stopping mechanism for said motor including fluid pressure operated valve means controlled in accordance with the position of said member for controlling said fluid circuit.

2. Fluid pressure operated motor mechanism comprising, in combination, a member movable under the influence of a fluid pressure differential; means including a pressure supply circuit and a reversing valve mechanism for controlling the application of said differential pressure to said member; and means for bringing said motor to rest including fluid pressure operated valve mechanism movably responsive to the position of said member for controlling said supply circuit.

3. Fluid pressure operated motor mechanism comprising, in combination, a member movable under the influence of a fluid pressure differential; reversing valve mechanism for controlling the direction of movement of said member; a fluid pressure operated cut-off valve for controlling the application of said fluid pressure differential to said motor; and stopping means for said motor rendered effective in accordance with the position of said member for controlling said cut-off valve.

4. Fluid pressure operated motor mechanism comprising, in combination, a member movable under the influence of a fluid pressure differential; a reversing valve mechanism for controlling the direction of movement of said member; a pressure supply line leading to said motor; a fluid pressure operated cut-off valve disposed to open and close the supply line; and stopping mechanism for said motor controlled in accordance with the position of said member for actuating said cut-off valve.

5. Fluid pressure operated motor mechanism comprising, in combination, a member movable under the influence of a fluid pressure differential; reversing valve mechanism for controlling the direction of movement of said member; fluid circuit means for controlling the application of said fluid pressure differential to said motor; a fluid pressure operated cut-off valve disposed to open and close said circuit means; and means including a selectively operable stopping valve rendered effective in accordance with the position of said member for actuating said cut-off valve.

6. Fluid pressure operated motor mechanism comprising, in combination, a member disposed to be moved under the influence of a fluid pressure differential; reversing valve mechanism for controlling the direction of movement of said member; fluid circuit means for controlling the application of said fluid pressure differential to said motor; a fluid pressure operated cut-off valve for opening and closing said circuit means; and a fluid circuit for said cut-off valve controlled in accordance with the position of said member.

7. Fluid pressure operated motor mechanism comprising, in combination, a member disposed to be reciprocated under the influence of a fluid pressure differential; reversing valve mechanism for controlling the direction of movement of said member; fluid circuit means for applying said fluid pressure differential to said motor; a fluid pressure operated cut-off valve for opening and closing said circuit means; a stopping valve; and a fluid actuating circuit for said cut-off valve controlled jointly by said stopping valve and by the position of said member.

8. Fluid pressure operated motor mechanism comprising, in combination, a member disposed to be reciprocated between predetermined limits under the influence of a fluid pressure differential; reversing valve mechanism for controlling the direction of movement of said member; means including a fluid circuit for applying said fluid pressure differential to said motor; a cut-off valve for opening and closing said circuit; and stopping means for said motor disposed to delay operation of said reversing valve mechanism and to cause said member to be moved to a position beyond said limit and be stopped by said cut-off valve.

9. Fluid pressure operated motor mechanism comprising a member disposed to be moved under the influence of a fluid pressure differential between normal limits and to a position beyond one of said normal limits; reversing valve mechanism normally effective to reverse said member at said normal limits; cut-off valve mechanism for stopping said motor; and a selectively operable stopping device operable to delay operation of said reversing mechanism at one of said limits and to cause said member to move to and be stopped at said further position by said cut-off valve.

10. Fluid pressure operated motor mechanism comprising, in combination, a member disposed to be moved under the influence of a fluid pressure differential between a first and second limit positions and a stopping position beyond said second limit position; reversing valve mechanism for said motor normally effective to reverse said member at said second limit position; a cut-off valve for stopping said motor at said stopping position; and a selectively operable stopping device for delaying operation of said reversing mechanism and for actuating said cut-off valve to cause said motor to stop at said stopping position.

11. Fluid pressure operated motor mechanism comprising, in combination, a member disposed to be moved under the influence of fluid pressure between first and second normal limit positions and a stopping position beyond said second limit position; reversing valve mechanism normally effective to reverse said member at said second limit position; a cut-off valve for stopping said motor; and a selectively operable stopping device operable at any time during the movement of said member for delaying operation of said reversing valve and for rendering said cut-off valve effective to stop said motor at said stopping position.

12. Fluid pressure operated motor mechanism comprising, in combination, a member disposed to be reciprocated under the influence of a fluid pressure differential between first and second normal limit positions and movable to a stopping position beyond said second limit position; reversing valve mechanism normally effective to reverse said motor at said second limit position; a cut-off valve for stopping said motor; and a selectively operable parking stopping device rendered effective in accordance with the position of said member for delaying the operation of said reversing valve mechanism and for rendering said cut-off valve effective to stop said motor at said stopping position.

13. Fluid pressure operated motor mechanism comprising, in combination, a member disposed to be moved under the influence of a fluid pressure differential between first and second limit positions and to a stopping position beyond said second limit position; a fluid pressure actuated reversing valve mechanism normally effective to reverse said motor at said second limit position; a fluid pressure operated cut-off valve for stopping said motor; a fluid circuit for said reversing valve mechanism; a fluid circuit for said cut-off valve; and means including a selectively operable stopping device operable to control said fluid circuit to thereby delay the operation of said reversing valve and to render said cut-off valve effective to stop said motor at said stopping position.

14. Fluid pressure operated motor mechanism comprising, in combination, a member disposed to be moved under the influence of a fluid pressure differential between first and second limit positions and to a stopping position beyond said second limit position; a fluid pressure actuated reversing valve mechanism normally effective to reverse said motor at said second limit position; a fluid pressure operated cut-off valve for stopping said motor; a fluid circuit for said reversing valve mechanism; a fluid circuit for said cut-off valve; and means including selectively operable stopping device rendered effective by movement of said member for controlling said fluid circuits to thereby cause said member to move to and stop at said stopping position.

15. Fluid pressure operated motor mechanism comprising, in combination, a member disposed to be moved under the influence of a fluid pressure differential; reversing valve mechanism for controlling the direction of movement of said member; a cut-off valve for controlling the application to said motor of said fluid differential; spring means for urging said cut-off valve to one of said positions; fluid pressure means for actuating said cut-off valve to the other of said positions; and a selectively operable stopping device for said motor for controlling said fluid pressure means.

16. Fluid pressure operated motor mechanism comprising, in combination, a member disposed to be moved under the influence of a fluid pressure differential; reversing valve mechanism for controlling the direction of movement of said member; a cut-off valve for controlling the application to said motor of said fluid differential; spring means for urging said cut-off valve to one of said positions; fluid pressure means for actuating said cut-off valve to the other of said positions; and a selectively operable stopping device controlled in accordance with the position of said member for controlling said fluid pressure means.

17. Fluid pressure operated motor mechanism comprising, in combination, a member disposed to be moved under the influence of a fluid pressure differential; fluid pressure operated reversing valve mechanism for controlling the direction of movement of said member; a fluid pressure operated cut-off valve actuable to control the application of said fluid pressure differential to said motor; a fluid circuit for said reversing valve mechanism; a fluid circuit for said cut-off valve; and valve passage means common to said fluid circuits and disposed to be opened and closed by movement of said member.

18. Fluid pressure operated motor mechanism comprising, in combination, a member disposed to be moved under the influence of a fluid pressure differential; fluid pressure operated reversing valve mechanism for controlling the direction of movement of said member; a fluid pressure operated cut-off valve for controlling the application to said motor of said fluid pressure differential; a fluid circuit for said reversing valve mechanism; a fluid circuit for said cut-off valve; and fluid passages individual to said fluid circuits and disposed to be opened and closed by movement of said member.

19. Fluid pressure operated motor mechanism comprising, in combination, a member disposed to be moved under the influence of a fluid pressure differential; fluid pressure operated reversing valve mechanism for controlling the direction of movement of said member; a fluid pressure operated cut-off valve for controlling the application to said motor of said fluid pressure differential; a fluid circuit for said reversing valve mechanism; a fluid circuit for said cut-off valve; fluid passages individual to said fluid circuits and disposed to be opened and closed by movement of said member; and a selectively operable parking device additionally effective to control said fluid circuits.

20. Fluid pressure operated motor mechanism comprising, in combination, a member disposed to be moved between first and second limit positions and a stopping position beyond said second limit position under the influence of a fluid pressure differential; fluid pressure operated reversing mechanism for normally reversing said motor at said second limit position; a fluid cut-off circuit for said reversing valve mechanism; and means including a selectively operable control device for said motor and effective when in one position to cause completion of said fluid circuit when said member reaches that said second limit position and effective when in another position to cause completion of said fluid circuit when said member reaches said stopping position.

21. Fluid pressure operated motor mechanism comprising, in combination, a member disposed to be moved under the influence of a fluid pressure differential between first and second limit positions and a stopping position beyond said second limit position; fluid pressure operated reversing valve mechanism for controlling the direction of movement of said member; a first fluid circuit disposed to be completed when said member reaches said second limit position for actuating said reversing valve mechanism; a second fluid circuit disposed to be completed when said member reaches said stopping position for actuating said reversing valve mechanism; and a selectively operable control device for determining which of said fluid circuits is to be effective.

22. Fluid pressure operated motor mechanism comprising, in combination, a member disposed to be moved under the influence of a fluid pressure differential between first and second limit positions and a stopping position beyond said second limit position; fluid pressure operated reversing valve mechanism for controlling the direction of movement of said member; a first fluid circuit disposed to be completed when said member reaches said second limit position for actuating said reversing valve mechanism; a second fluid circuit disposed to be completed when said member reaches said stopping position for actuating said reversing valve mechanism; a selectively operable control device for determining which of said fluid circuits is to be effective; and a cut-off valve for stopping said motor at said stopping position.

23. Fluid pressure operated motor mechanism comprising, in combination, a member disposed to be moved under the influence of a fluid pressure differential between first and second limit positions and a stopping position beyond said second limit position; fluid pressure operated reversing valve mechanism for controlling the direction of movement of said member; a first fluid circuit disposed to be completed when said member reaches said second limit position for actuating said reversing valve mechanism; a second fluid circuit disposed to be completed when said member reaches said stopping position for actuating said reversing valve mechanism; a selectively operable control device for determining which of said fluid circuits is to be effective; and a cut-off valve responsive to said control device for stopping said motor at said stopping position.

HUMPHREY F. PARKER.